No. 795,832. PATENTED AUG. 1, 1905.
J. HEYDE.
WIRE SPLICING MACHINE.
APPLICATION FILED NOV. 24, 1903.
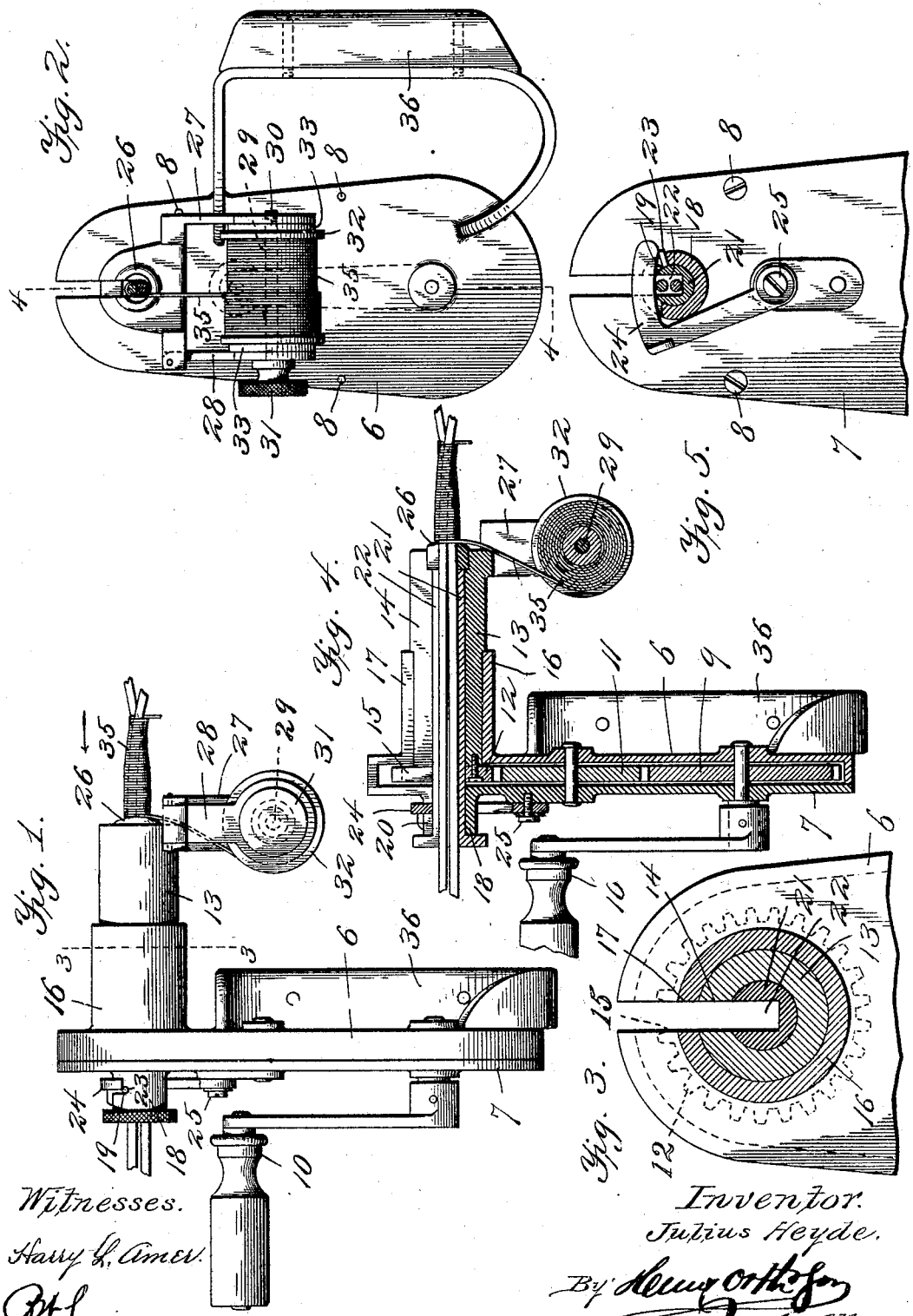
Witnesses.
Harry L. Amer
B. H. Sommers
Inventor.
Julius Heyde.
By Henry Orth
Att'ys

UNITED STATES PATENT OFFICE.

JULIUS HEYDE, OF ZURICH, SWITZERLAND.

WIRE-SPLICING MACHINE.

No. 795,832.        Specification of Letters Patent.        Patented Aug. 1, 1905.

Application filed November 24, 1903. Serial No. 182,529.

*To all whom it may concern:*

Be it known that I, JULIUS HEYDE, a subject of the German Emperor, residing in Zurich, Switzerland, have invented certain new and useful Improvements in Wire-Splicing Machines; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to hand implements for splicing the ends of telegraph, telephone, and other wires, and has for its object means to hold the ends of the wire in the implement while being spliced and details of construction to be hereinafter fully described and claimed.

Referring to the drawings, in which like parts are similarly designated, Figure 1 is a side view of the device; Fig. 2, an end view thereof; Fig. 3, a section on line 3 3, Fig. 1; Fig. 4, a section on line 4 4, Fig. 2; and Fig. 5 is a detail, partly in section, showing the hook and the parts engaged thereby.

In a suitable casing 6, closed by a side plate 7, held on by screws 8, is mounted a gear 9, rotated by a crank or handle 10. This gear meshes with one, 11, that drives a slotted gear 12, screwed or otherwise secured to a rotatable sleeve 13, having a longitudinal slot 14 in lateral register with the slot 15 in gear 12 and mounted in the sleeve 16, also having a longitudinal slot 17, said sleeve 16 forming part of or secured to the casing 6.

On the plate 7 is boss 18, having a transverse groove 19 and a longitudinal slot 20 to form a bayonet-joint for the grooved cylinder. Within the boss 18 and rotatable sleeve 13 is a removable exchangeable cylinder 21, having a longitudinal groove 22 and a pin 23, that enters the transverse groove 19. A hook 24, pivoted to the plate 7 on a screw 25, enters the transverse groove 19 in the boss 18 over the pin 23.

Driven tight into the end of the rotatable sleeve 13 is a slotted laying-on nose 26, of hardened steel, that is beveled or is one turn of a helix. The outer end of the rotatable sleeve 13 also carries a fixed arm 27 and a hinged arm 28, there being held in the latter a spindle 29, having a threaded end 30, that takes into the fixed arm 27. This spindle has a milled head 31 to enable a spool 32, placed in spindle 29, to be frictionally held on the spindle and between the arms. Each arm has secured to it a leather or other friction disk 33, whereby on turning the spindle 29 the head of the spool 32 may be clamped more or less tightly between the arms to adjust the tension of the winding wire. A suitable handle 36 is provided to support the tool in one hand while the other turns the crank.

That cylinder 21 the width of whose slot 22 is substantially equal to the diameter of the wire to be spliced is slipped through the boss 18, the pin 23 lying in the transverse groove 19, as shown in Fig. 1, and the two ends of the wire that are to be connected are passed through all the slots that now register, so that the wires will lie one on top of the other and the hook 24 thrown over the wires as they lie in the groove 19 to hold the pin 23 in place and prevent the slotted cylinder from rotating and hold the wires in the groove of the cylinder. The end of the splicing-wire 35 on the spool is given a turn or two by hand around one of the wires. The tool is then shoved up to this turn of wire and slack from the spool taken up. The handle 10 is then turned, thereby rotating wheels 9, 11, and 12 and the slotted sleeve 13 and revolves the spool around the wires being spliced. The wire will feed off the spool past the nose 26 to lay the wire turn for turn against those already formed, simultaneously wedging the tool along the wires to be spliced in the direction of the arrow, or if the tool is held rigid then the wires to be spliced are fed through the tool in an opposite direction. The tension of the splicing-wire is adjusted by the screw-spindle 29.

It is preferable, though not absolutely necessary, to have several cylinders 21, the grooves in which are of different depths and widths to accommodate wires of different sizes and still hold them superposed.

Having thus described my invention, what I claim as new therein, and desire to secure by Letters Patent, is—

1. A wire-winding machine, comprising a casing having a boss and sleeve in alinement, and a continuous slot extending from one end of the boss to the end of the sleeve, a longitudinally-slotted rotatable sleeve held in the sleeve on the casing, a slotted gear secured to the rotatable sleeve, a crank-handle and gearing to rotate the revoluble sleeve, a slotted cylinder in the rotatable sleeve and removably secured to the boss, a hook to take over the cylinder, a laying-on nose and a spool-carrier adjustable as to tension on the revoluble sleeve, substantially as described.

2. In a wire-splicing machine, the combination with an exchangeable grooved cylinder; of a slotted sleeve, mechanism to rotate the sleeve, and means to hold the cylinder and permit it to readily be exchanged for a similar cylinder to accommodate a different size of wire, substantially as described.

3. In a wire-splicing machine, the combination with a slotted sleeve and a slotted revoluble sleeve therein; of a stationary slotted cylinder held in the revoluble sleeve, and means on the revoluble sleeve to feed a splicing-wire, substantially as described.

4. In a wire-splicing machine, the combination with a removable grooved cylinder; of a slotted sleeve concentric therewith and having a laying-on nose, mechanism to rotate the sleeve, means to hold the cylinder stationary and a spool-carrier and tension device on the sleeve, substantially as described.

5. In a wire-splicing machine, the combination with a removable grooved cylinder; of a slotted sleeve concentric therewith, mechanism to rotate the sleeve, a slotted laying-on nose of hardened metal in the end of said cylinder, a fixed and a hinged arm on the end of the sleeve, a spindle to connect the arms and friction-pads on the proximate faces of the arms, substantially as described.

6. In a wire-splicing machine, the combination with a removable slotted cylinder; of a concentric longitudinally-slotted sleeve, crank-operated mechanism to rotate the sleeve, a hook to hold the cylinder and wires to be spliced, a spiral laying-on nose in one end of the cylinder having a slot and of hardened metal, a spool carried by the sleeve and means to frictionally retard the rotation of said spool, substantially as described.

7. In a hand implement for splicing wire, a stationary cylinder for the wires to be spliced, a slotted sleeve revoluble about said cylinder, and means controlled by the rotation of the sleeve to wind the splicing-wire about the wires to be spliced, substantially as described.

8. In a wire-splicing machine, a stationary cylinder for the wires to be spliced, a sleeve revoluble about said cylinder, means controlled by the rotation of the revoluble sleeve to wind the splicing-wire about the wires to be spliced, and means to move said sleeve and cylinder along the wires to be spliced as the splicing progresses, substantially as set forth.

9. In a wire-splicing machine, a stationary cylinder for the wires to be spliced, a sleeve revoluble about said cylinder, means controlled by the rotation of the revoluble sleeve to wind the splicing-wire about the wires to be spliced, and means controlled by the winding on of the splicing-wire to move said sleeve and cylinder along said wires to be spliced as the splicing progresses, substantially as set forth.

10. The combination with a slotted cylinder, of a slotted sleeve, means to revolve the sleeve about the cylinder, a laying-on nose in the end of the sleeve in alinement with the cylinder, and means controlled by the rotation of the sleeve to wind the splicing-wire about the wires to be spliced, substantially as described.

In testimony that I claim the foregoing as my invention I have signed my name in presence of two subscribing witnesses.

JULIUS HEYDE.

Witnesses:
   Louis Schmassmann,
   F. Lehmann.